United States Patent [19]

Bernard

[11] 3,834,540

[45] Sept. 10, 1974

[54] COMBINED APPARATUS FOR THE BIOLOGICAL PURIFICATION OF WASTE WATERS

[75] Inventor: Jacques J. P. Bernard, Saint Germain en Laye, France

[73] Assignee: Degremont, Societe Generale D'Epuration et D'Assaninissement, Rueil-Naimaison, France

[22] Filed: Jan. 3, 1972

[21] Appl. No.: 214,794

[30] Foreign Application Priority Data

July 20, 1971 France .............................. 71.26465

[52] U.S. Cl. ................................ 210/195, 210/197
[51] Int. Cl. .............................................. C02c 1/08
[58] Field of Search ................................ 210/3–5, 7, 210/14, 16, 19, 63, 90, 102, 130, 138, 141, 142, 143, 144, 195, 197, 220, 221, 256, 258, 260, 319, 320, 413, 521, 534, 536, 194

[56] References Cited
UNITED STATES PATENTS

| | | | |
|---|---|---|---|
| 3,330,413 | 7/1967 | Danjes ............................. | 210/195 |
| 3,339,741 | 9/1967 | Bernard et al. ................... | 210/195 |
| 3,396,102 | 8/1968 | Forrest ............................. | 210/7 |
| 3,511,380 | 5/1970 | Rice et al. ........................ | 210/521 X |
| 3,642,615 | 2/1972 | Wieferig .......................... | 210/14 X |

*Primary Examiner*—Samih N. Zaharna
*Assistant Examiner*—Robert H. Spitzer
*Attorney, Agent, or Firm*—Davis, Hoxie, Faithfull & Hapgood

[57] ABSTRACT

Combined apparatus for the biological purification of waste waters by means of activated sludges, which comprises at least two coupled clarification tanks which are in communication with an aerator tank as well as means for recycling the settled sludges coming from the clarification tanks into the aerator tank, characterized by the fact that the means for recycling the settled sludges consist of air pumps of the "air-lift" type which discharge into the aerator from each of the clarifiers and which are fed with air with a pulsating intermittent flow, alternating in each of the clarifiers, which causes a pulsating recirculation of the settled sludges, alternately from each of the clarifiers towards the aerator. The air-lifts are so developed that they have a base which is flared with respect to their top, said base constituting the orifice thereof for the drawing in of settled sludges which are to be recycled.

1 Claim, 5 Drawing Figures

PATENTED SEP 10 1974　3,834,540

COMBINED APPARATUS FOR THE BIOLOGICAL PURIFICATION OF WASTE WATERS

The present invention relates to a combined apparatus for the biological purification of waste waters.

It is known that the treatment of a waste water by means of "activated sludges" consists essentially in contacting the water to be treated with sludges containing aerobic microorganisms for its biological purification.

This treatment is carried out in installations consisting essentially of two tanks known as an "aerator" and a "clarifier" in which the two essential phases of the treatment are carried out:

the aerator is a tank in which the water to be treated is contacted, under aeration, with the activated sludges;

the clarifier is a sedimentation-clarification tank in which the "biological flock" separates out towards the bottom and the purified interstitial water separates out on top.

At the present time there are two types of such plants:

the "separate tank" plants having, as their name indicates, a separate tank for each phase of treatment, the exchanges between tanks being effected by means of conduits, some provided with pumping means;

the "combined tank" plants in which the two phases of treatment are carried out in parallel or concentric tanks arranged along side of each other and communicating directly with each other over a certain length. In such double tanks one can distinguish between an aeration zone and a sedimentation-clarification zone.

Whatever the type of installation, a transfer of sludge takes place during the treatment from the aerator towards the bottom of the clarifier where these sludges settle out. It is important to recycle these sludges to the aerator where they are again aerated so as to maintain in the latter a concentration of microorganisms which is sufficient to assure the elimination of the organic pollution contained in the water to be purified.

A simple diagram of an installation of known type having separate tanks is given in FIG. 1. The raw water (1) is introduced into the aeration tank (2) into which the oxygen is introduced by means of a header (3) fed from an air compressor through line "S".

The liquor mixed with activated sludge which comes from (2) feeds the clarifier (6) through the piping (5). The purified water is evacuated at (7). The sludges which have deposited out in the bottom of (6) are recycled towards (2) by means of the pumping device (4).

This pump may have a mechanical drive or be of the known "air" or "emulsion" type, also known as an "air-lift" pump. This latter type of pump (4) is shown in FIG. 1. A tapping of air under pressure (8) from the delivery pipe S of the compressor makes it possible to introduce into the air-lift pump (4) a sufficient flow of air to assure the extraction of the sedimented sludges and the return of them to the aeration.

Numerous activated sludge plants have thus been established in accordance with the diagram of FIG. 1 with the use of an air-lift for the recycling of the sludges; unfortunately, this effective arrangement which is of dependable operation is limited to small stations. As a matter of fact, the taking up of sludges by an air-lift pump is effected in a "punctiform" manner: it requires the taking of measures to see to it that the sludges are naturally directed to the bottom of the air-lift pump (4). There is a single clarifier, whether square or circular, and its hopper has a sufficient slope (more than 50° with respect to the horizontal) to prevent stagnations and deposits on the walls. As a result, the use of a clarifier of large diameter (more than 10.00 m) is impossible from a practical standpoint, since it would require the construction of very deep clarifiers, the cost of construction of which would be prohibitive.

In the case of large rates of flow, instead of multiplying the number of clarifiers — with always complicated problems of hydraulic distribution— there have been proposed multiple-hopper clarifiers, each equipped with a pipeline for extraction by air-lift. The idea then was suggested of combining the clarification and the aeration tank in a single apparatus. FIG. 2 shows the basic diagram of such a combined apparatus for the biological purification of waste waters, a certain number of which are in existence. This apparatus has a longitudinal axis of symmetry and is of transverse operation.

The quantity Q of water to be purified is then introduced by means of a chute (9) provided with distributing spillways into a central aeration zone (10) into which the oxygen necessary for the development of the microorganisms is introduced by means of air diffusers (11).

The activated sludge liquor (feed flow Q + recirculation flow $q$) then passes into two lateral clarifiers (12) through two upper slots (13).

The stream of water treated is discharged at (14) by means of collecting spillways. The sedimented sludges collect in a series of hoppers (15), each equipped with a sludge extraction pipe provided with an air inlet and discharging the sludges at (10) into the aeration zone, discharging above the level of the water.

The flow recirculated by the different air-lifts is the recirculation flow $q$.

This embodiment of the combined apparatus as shown schematically in FIG. 2, while it makes it possible to combine the entire purification process in a single compact unit, nevertheless has important drawbacks, namely:

the construction of a large number of hoppers in the clarifiers is very expensive and very substantially reduces the useful volume of the sedimentation zones and therefore increases the retention time of the water to be treated;

the distribution of the recirculation flow, equally among the different hoppers, is rather difficult to effect, since the amounts of air to be injected in the different sludge recirculation pipes are small. Imbalances can then take place in the concentration of the sludges over the entire length of the apparatus or between each of the two sedimentation zones.

In order to reduce the size of the hoppers to be built within the clarifiers, one solution proposed in the prior art consists in providing a recycling conduit the mouth of which is substantially continuous over the entire length of the apparatus and in which walls extend the outlet of these conduits into the aeration zone. The air is introduced on the one hand by means of diffusers placed in the aeration zone proper and on the other hand by means of diffusers placed at the outlet of the recirculation conduits within the walls.

The air injected into the diffusers has essentially the purpose of supplying the driving power necessary for the pumping and recycling of the sludges which have settled in the central aeration zone.

In accordance with the prior art described, the feeding of the clarification zones at a rate of flow equal to the rate of flow of raw water + recirculation flow is distributed throughout the entire length due to two continuous slots provided in the upper part of the main separation walls. In front of each slot, a deflecting partition is arranged.

This arrangement, however, has very serious drawbacks:

1. Due to the very frequent presence in the water to be treated of bulky bodies, wadded hair, etc., the smallest dimension of the recycling conduits must remain sufficient if one does not desire to run the risk of clogging the inlet leading to the non-recycling of the sedimented sludges which then enter into anaerobic fermentation resulting in a deterioration of the treatment process.

Moreover, in order to assure the drive of all the settled sludges, including even the heaviest, towards the aeration zone, a substantial recirculation flow $q$ must be maintained, which flow may amount to several times the maximum flow $Q$ to be treated.

The corresponding introduction into the clarifiers of a very high flow of water $Q+q$ leads to very great turbulence at the outlet of the partitions, which turbulence results in a serious deterioration in the quality of the sedimentation.

This could be remedied only by reducing the rate of flow $q$ but this is not possible, since one would then run the risk of a clogging of the recycling conduit and therefore the stopping of the recirculation.

2. An increase of pressure in the feed air circuit — resulting, for instance, from an increase in the rate of flow of air injected through the diffusers as a result of a larger demand for oxygen on the part of the bacterial flora — leads to an increase in the rate of flow of injected air through the diffusers and therefore of the recycle flow $q$ which may result in additional hydraulic disturbances in the clarifiers. A decrease may, on the other hand, increase the risks of the at least partial blocking of the recirculation.

3. An increase in the flow of air injected through the diffusers leads furthermore by itself to an increase in the flow $q$ as a result of the decrease in density of the emulsion present in the aeration zone. It is thus seen that the recycle flow is not independent of the variations of the flow of aeration air which the variations in the oxygen demand of the activated sludges may require.

4. As the upper slots are continuous, a substantial part of the sludges which have just been recycled via the ducts is directly introduced by said slots into the clarification zones without having been mixed with the content of the aeration zone. There is thus a "short-circuiting" of a part of the concentrated recycled sludges — a useless loading of the clarifier by the weight of dry substances — with the risk of accentuating in the clarifier the phenomena of denitrification and ascent to the surface of the activated sludges.

The object of the present invention is to provide combined apparatus for the biological purification of waste waters which better satisfy the practical requirements than the apparatus for the same purpose which have been heretofore known, particularly by permitting the production of installations of large dimensions and of effective and reliable operation, the sedimentation zones of which have a substantial useful volume and the cost for which is substantially less than that of the prior-art proposals. The combined apparatus in accordance with the present invention furthermore avoids the drawbacks of the apparatus for the same purpose which were previously known, in particular by the fact that the recycling of the sedimented sludges is effected independently of the manner of oxygenation and by the fact that the apparatus is designed in such a manner that it cannot be the seat of hydraulic disturbances, nor the place of short-circuiting of the concentrated recycled sludges, in the clarifier without previous passage through the aeration zone, the apparatus of the present invention making it possible very substantially to reduce the average recycle flow.

The object of the present invention therefore is a combined apparatus for the biological purification of waste waters by means of activated sludges which comprises at least two coupled clarifier tanks in communication with an aerator tank as well as means for recycling the sedimented sludges coming from the clarification tanks into the aeration tank, characterized by the fact that the recycling means for the sedimented muds consist of air pumps of the "air-lift" type which discharge into the aerator from each of the clarifiers and which are fed with air in a pulsating intermittent flow, alternating in each of the clarifiers, which causes a pulsating recirculation of the sedimented sludges, alternately from each of the clarifiers, towards the aerator.

In accordance with one advantageous embodiment of the apparatus of the present invention, the control of the feeding of the air-lifts with air in accordance with a pulsating flow alternately in each of the clarifiers, which feed controls the pulsating recycling of the sedimented sludges alternately from each of the clarifiers, is effected by means of automatic devices with programmed operation.

In accordance with another advantageous embodiment of the apparatus in accordance with the present invention, the air-lifts are shaped in such a manner that they have a base which is flared with respect to their top, the said flared base constituting the orifice thereof for the drawing in of the decanted sludges to be recycled.

In accordance with a preferred arrangement of this embodiment, a plurality of air-lifts is mounted in connection with each of the clarifiers, the flared bases of said plurality of air-lifts constituting an uninterrupted adjoining series at the base of the clarifier, said series constituting a continuous communication orifice between the bottom of the clarifiers and the aerator.

In accordance with another advantageous embodiment of the apparatus of the present invention, the feed orifices of the clarifiers from the aeration tank are discontinuous, the upper outlet of the air-lifts being located between the said orifices.

In accordance with a third advantageous embodiment of the apparatus of the present invention, the air-lifts discharge via their upper end at a level close to that of the location of the orifices for the feeding of the clarifiers from the aeration tank.

In accordance with a fourth advantageous embodiment of the apparatus in accordance with the present invention, the orifices for the feeding of the clarifiers from the aeration tank are located at the level of the surface of the water or below same.

In accordance with a fifth advantageous embodiment of the apparatus in accordance with the present invention, the mount of the air-lifts in the apparatus forms an angle of between 45 and 90 to the horizontal.

In accordance with a sixth embodiment of the apparatus which is the object of the present invention, the bottom of the clarifiers is at a level substantially close to the floor of the aeration tank.

In accordance with a seventh advantageous embodiment of the apparatus of the present invention, the means for supplying the air-lifts with air and the means for supplying the aeration tank with air are independent of each other and are located at different levels, the outlets of the means for supplying the air-lifts with air being preferably located at a higher level than the level of the means for supplying the aeration tank with air.

In accordance with an eighth advantageous embodiment of the apparatus of the present invention, the automatic devices for the control of the flow of air introduced alternately into the air-lifts are equipped with a suitable device for maintaining the means for feeding the air-lifts with air under pressure when the said automatic control devices are closed, which has the effect of permitting the instantaneous starting of the air-lifts upon the opening of the control devices.

In accordance with a preferred arrangement of this embodiment, this device consists of a bypass provided with an adjustment valve of small diameter which maintains a very small leakage flow of adjustable amount.

In accordance with a ninth advantageous embodiment of the apparatus of the invention, the means for feeding the air-lifts with air are equipped with means for regulating the flow of air of the air-lifts, such as distribution diaphragms, valves, etc., for instance.

A preferred arrangement of the object of the invention provides for a programmed control of the regulating devices for the pulsating alternate flow of air in the air-lifts, such that the phases of large instantaneous flow are of short duration and that the phases of small or zero instantaneous flow are of a longer duration.

In addition to the arrangements which have just been mentioned, the invention also comprises other arrangements which will become evident from the following description.

The present invention relates particularly to combined apparatus for the biological purification of waste waters in accordance with the foregoing arrangements, as well as the elements for the establishing of these apparatus and the installations in which said apparatus are included.

The invention will be better understood from the following additional description taken with the accompanying drawings.

It is to be understood, however, that the accompanying drawings and the corresponding descriptive parts are given solely as illustrative of the invention and are not limitative.

Figure 1:
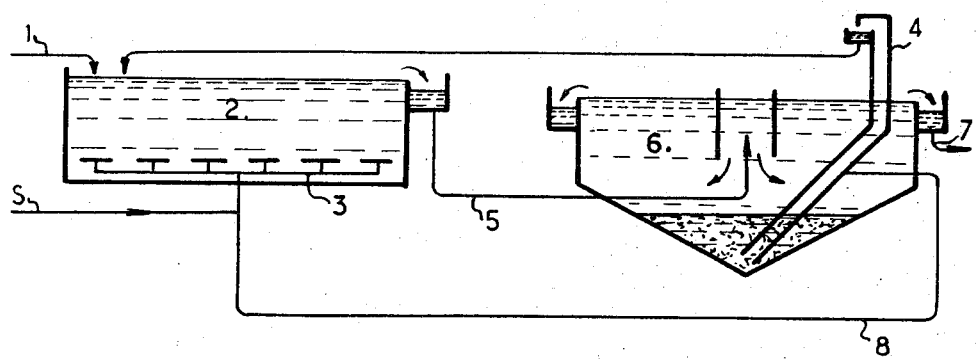
FIGS. 1 and 2 are schematic representations of prior art systems, as noted above.
Figure 2:
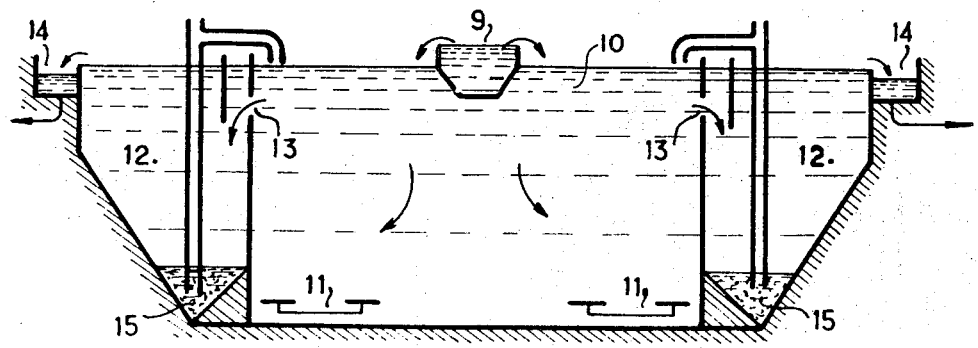
Figure 3:
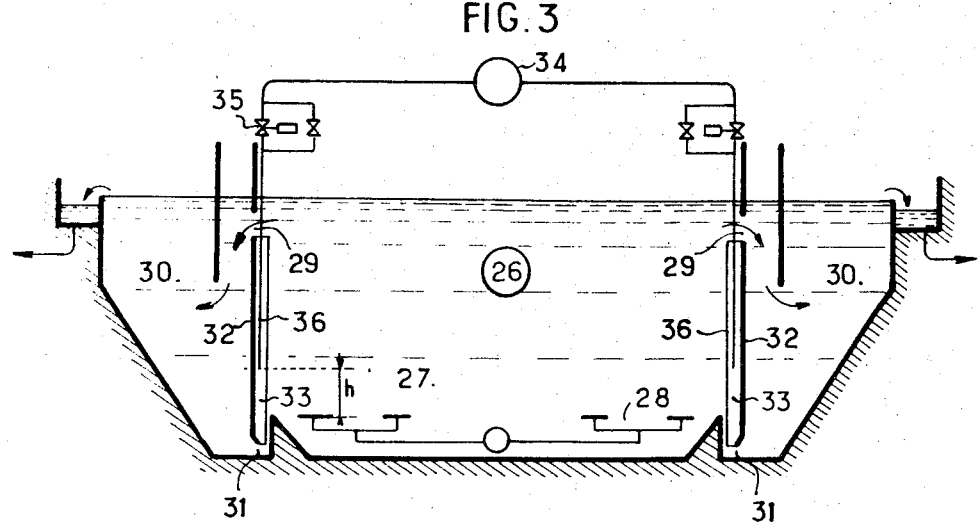
FIG. 3 is a schematic representation, seen in section, of an embodiment of the apparatus in accordance with the present invention.

In the embodiment shown in FIG. 3, the water to be treated is introduced through a distribution pipeline 26 into the aeration zone 27 into which the air necessary for the oxygenation proper is introduced through a header which feeds the diffusers 28. Upper ports 29 assure the feeding of two lateral clarifiers 30. The sludges which have settled out in the clarifiers 30 are taken up through two continuous lower slots 31. A series of air-lifts 33 is mounted along each lateral wall 32 separating the aerator and the clarifiers. These air-lifts 33 are flared at their base in such a manner that their uninterrupted, adjoining succession (see FIG. 5) entirely obstructs the passage at the base of the separation wall 32.

The feeding of the air-lifts 33 with air is assured for all of the air-lifts which correspond to each of the clarification zones from a common header 34 via automatic valves 35, one of which controls the air-lifts which cause the recycling of the settled sludges coming from a given clarifier (for instance that on the left) and the other of which controls the air-lifts which cause the recycling of the settled sludges coming from the other clarifier.

Figure 5:
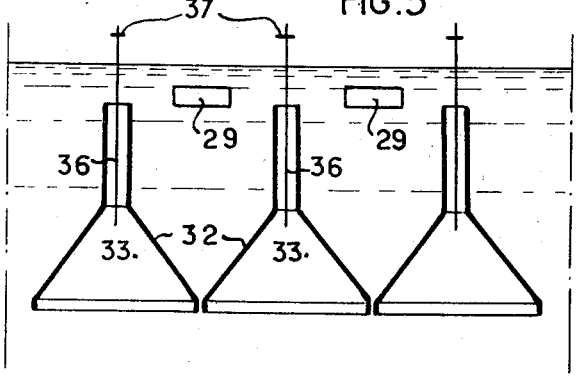
FIG. 5 is a detail view in elevation of the apparatus of FIG. 3.

The introduction of the air into each of the air-lifts 33 is assured by a tube 36 provided, for instance, with a distribution diaphragm 37, as shown in FIG. 5. Each of the tubes 36 discharges into the liquid to be treated at a level which is at a distance $h$ above the diffusers 28 which may be between, for instance, 20 and 50 cm.

The feeding of the air-lifts 33 with air is intermittent so as to obtain a pulsation of the recycling flow of the settled sludges towards the aerator. A programmer (not shown) for controlling the automatic valves 35 regulates this pulsation.

The lefthand and righthand valves 35 are not opened simultaneously but in succession. The time of opening as well as the time of closure of each of these valves 35 is adjustable. For example, each of these valves 35 can be regulated to remain open between 0 and 60 seconds and to remain shut for between 0 and 60 minutes.

The valves 35 have a by-pass provided with a valve of small diameter, the purpose of which is to maintain all of the tubes 36 under pressure, with practically zero flow of air, during the periods when the valves 35 are closed so that upon the opening of the said valves the air-lifts 33 start immediately.

Figure 4:
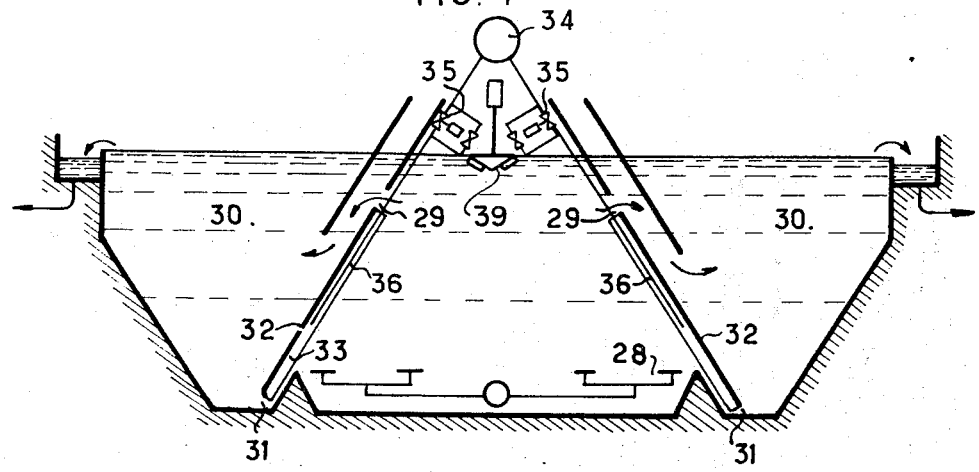
FIG. 4 is a schematic representation of another embodiment of the apparatus in accordance with the present invention, also seen in section.

While in FIG. 3 the separating wall 32 is vertical, it is inclined in FIG. 4, which has the advantage of permitting the development of the clarifiers at their upper part, to the detriment of the aerator, the air-lifts being then also arranged obliquely.

Similarly, while in FIG. 3 the aeration of the aeration zone 27 is effected via diffusers 28, in FIG. 4 it is obtained via the turbine 39 mounted on the surface.

The combined apparatus for the biological purification of waste waters in accordance with the provisions of the present invention results in a certain number of advantages not present in the previously known apparatus directed at the same purpose, in particular:

1. The instantaneous recycling flow of the sludges is independent of the manner and rate of oxygenation in the aeration zone proper so that in the absence of a flow of air in the tubes 36, that is to say, when the corresponding valve 35 is closed, the recirculation flow of the sludges is zero; as a matter of fact, there can then be no "natural recycling" due to the equilibrium of the pressures prevailing at the downstream and upstream ends of the air-lift, determined by the arrangement of the outlet of the air-lifts between the discontinuous slots 29; this absence of natural recycling also results from the arrangement of the air-lifts at the level of the surface of the liquid and below this level.

2. The pulsation of the flow of recycling air and therefore of the flow of the recirculated sludges makes it possible to assure very high speeds of passage through the air-lift inlets 31 while maintaining the average recycling flow at very moderate values.

3. The rate of the pulsation is easily adjustable which makes it possible to limit the duration thereof to that permitted by the inertia of the bed of sludge during sedimentation.

4. It is even possible, by suitably calculating the losses in head of the ports 29, to eliminate any overflow of purified water during the recycling period in the clarifier where the recycling is effected: as a matter of fact, the alternation of the pulses has the consequence — if the cross section of the said ports 29 is sufficiently small — of causing the preferential passage of the recycled instantaneous flow stored in the aerator towards the clarifier which at that moment is not recycling and the taking over by which of supernatant water has not been modified, which limits the flow entering the clarifier during recycling and prevents the sedimentation being disturbed. This phenomenon can be explained as follows:

The pulsation stops the cross flow of water alternately in each of the clarifiers, which permits the phenomenon of coalescence of the sludges to take place freely and thus eliminates any effect of seepage, and therefore, by rehomogenizing the bed of sludge, improves the filtration and results in an improvement in the quality of the treated efflux.

5. The staggered arrangement of the air-lifts 33 and of the ports 29 makes it possible to avoid any direct passage of concentrated recycled sludges into the clarifier, upon the pulsation.

6. The important difference between the level of the admission of air into the air-lifts and the level of admission of air into the aeration zone, in the case shown in FIG. 3, and when the feed headers of the air-lifts and of the air diffusers are fed with compressed air by the same source makes it possible to eliminate practically any influence of the variations of the rate of flow of oxygenation air (and therefore of pressure) on the flow of recycling air.

As a matter of fact, the loss of head $h$ is selected in such a manner as to be far greater than the variations in loss of head of the diffusers as a function of the flow of air, with due consideration of the loss of head created by the distribution diaphragms 37.

7. Due to the very high driving energy available in the air-lifts, it is possible to recycle very concentrated sludges, and therefore to increase the solid recycling flow, which has the effect of limiting the liquid flow which can disturb the clarification.

8. The reduction of the liquid volume introduced for clarification is advantageously utilized to increase the concentration in the aerator and therefore to treat a higher weight of pollution for equivalent volume.

9. The increase in the concentration of the recycled sludges, inherent in the excellent energy yield of the "immersed" air-lifts has the result of reducing to a maximum the flow of injected air in the air-lifts which now only represents a few percent of the total flow of air necessary for the biological requirements.

10. The provisions of the present invention make it possible to reduce the volume of the clarifier, and in particular the depth of the latter, which can be at the level of the floor of the aerator.

From the foregoing description, it is clear that whatever the embodiments, realizations and applications in question, there are obtained combined apparatus for the biological purification of waste waters which have substantial advantages over the previously known apparatus for the same purpose, the principal advantages having just been pointed out.

As is evident from the foregoing, the invention is in no way limited to those variants, embodiments and applications which have just been described in the foregoing; rather, it covers all variations which may come to the mind of the man skilled in the art, without going beyond the scope of the present invention.

I claim:

1. In combined apparatus for the biological purification of waste waters by means of activated sludges having at least two clarifying tanks coupled with an aeration tank, a plurality of first connecting means for transferring sedimented sludge from each of said clarifying tanks to said aeration tank, and a plurality of second connecting means for transferring treated waste water mixed with sludge from said aeration tank to said clarifying tanks, the improvement wherein said first connecting means comprises air lift pumps, there being at least two of said pumps for each clarifying tank, and means for feeding air to said pumps in a pulsating intermittent flow, said flow alternating with respect to each of said clarifying tanks, whereby a pulsating recirculation of the settled sludge alternately from each of said clarifying tanks towards said aeration tank is caused, each of said pumps having a flared base located at the bottom of the clarifying tank and a narrow upper portion connecting to the aeration tank, the flared bases of the pumps in each of the clarifying tanks being located closely adjacent to one another to provide a substantially uninterrupted inlet port providing continuous communication between the bottom of each clarifying tank and the upper portion of the aeration tank.

* * * * *